Feb. 14, 1967  J. C. OESTERLE  3,303,915
AXIAL LOCKING CLUTCH
Filed Dec. 11, 1964  2 Sheets-Sheet 1
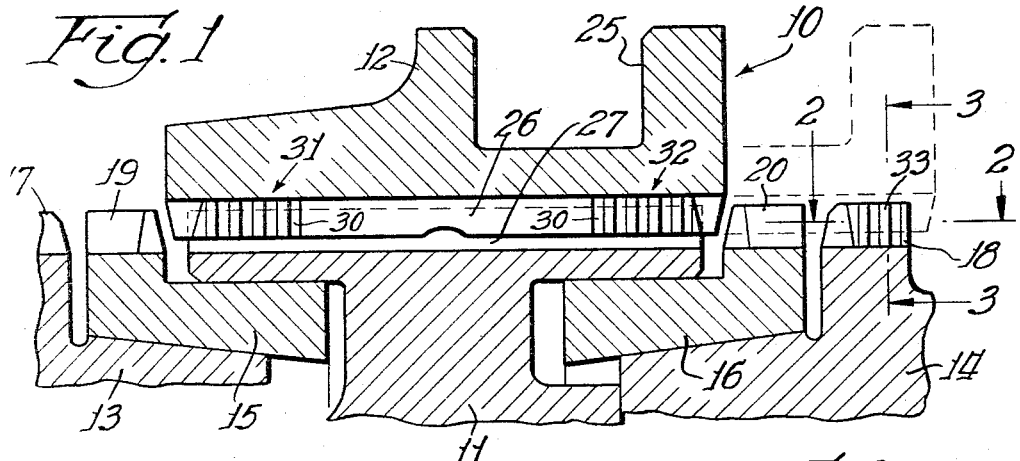
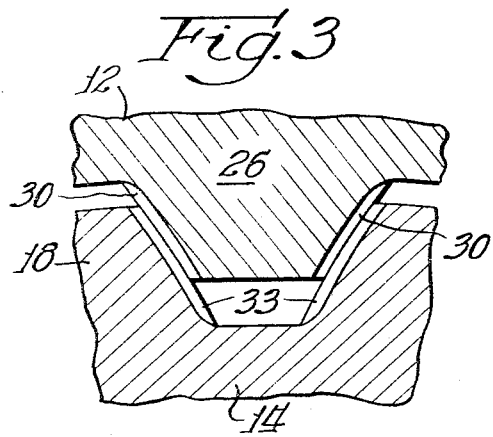
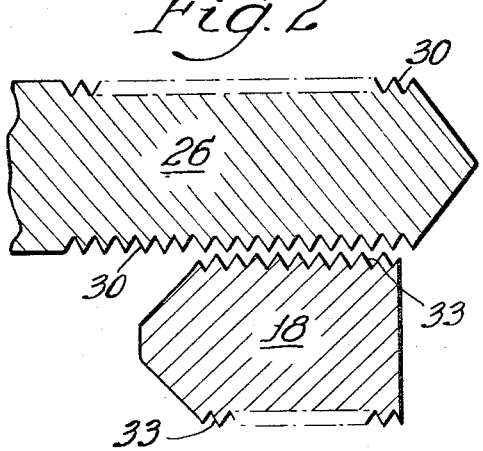
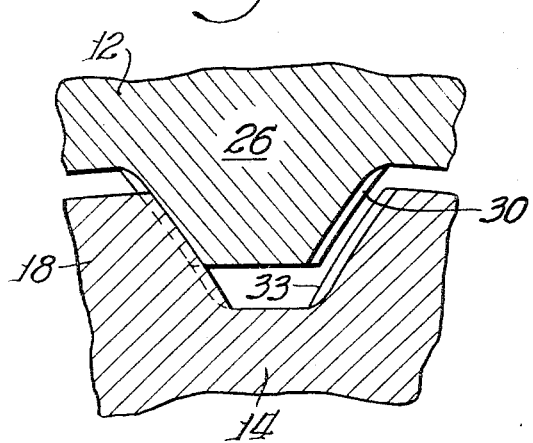
Inventor:
John C. Oesterle
By: Robert L. Zieg Atty.

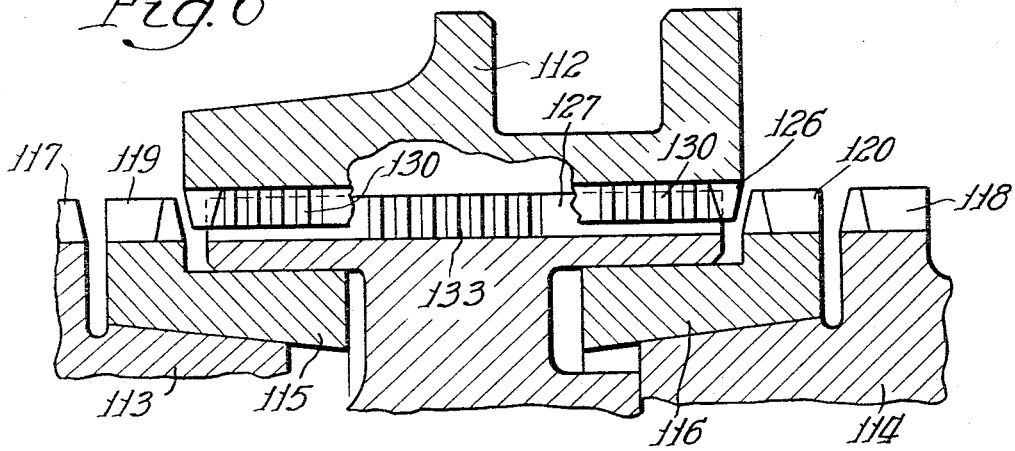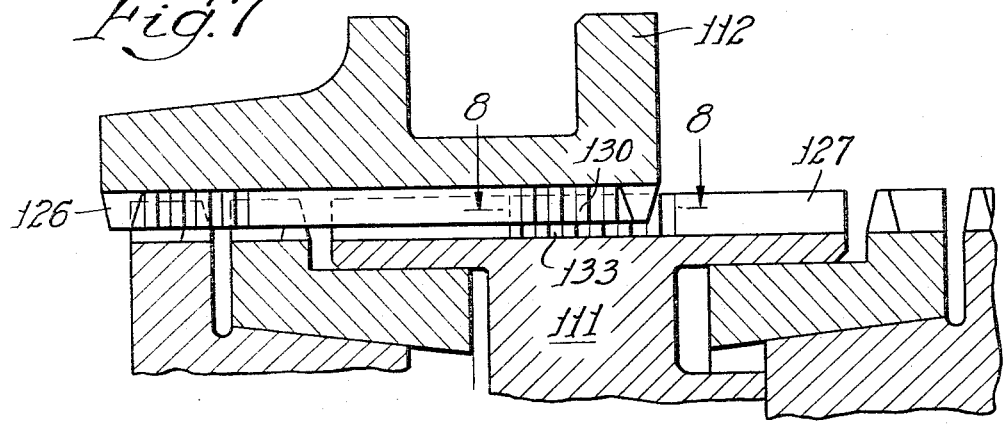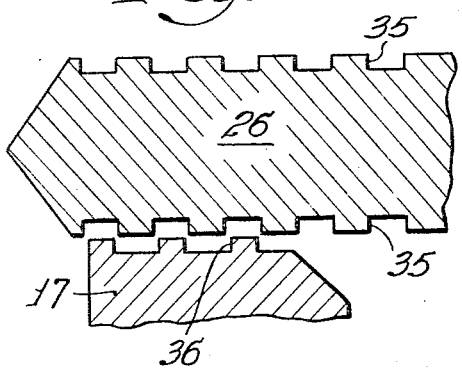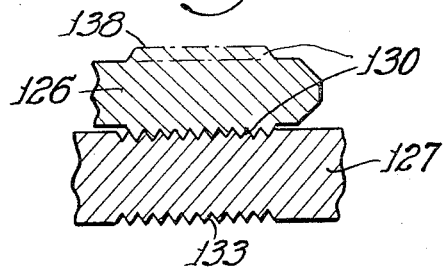
Inventor:
John C. Oesterle
By: Robert L. Zieg

United States Patent Office 3,303,915
Patented Feb. 14, 1967

3,303,915
AXIAL LOCKING CLUTCH
John C. Oesterle, Muncie, Ind., assignor to Borg-Warner Corporation, Chicago, Ill., a corporation of Illinois
Filed Dec. 11, 1964, Ser. No. 417,605
7 Claims. (Cl. 192—114)

This invention relates to positive clutches of the type comprising a slidable sleeve member as used in synchronizers and other torque transmitting applications.

One of the problems encountered in transmissions where where high torque loads are to be transmitted is that when a positive clutch element is used, as for example in a synchronizer structure which is slidably mounted to engage a gear in a transmission the slidable clutch element may tend to come out of engagement with the mating clutch teeth on the gear when under high torque loads.

Various solutions have been presented in the prior art to lock the sliding sleeve member of the synchronizer or clutch axially when the clutch engagement has been made to prevent the clutch from coming out of engagement. The solutions presented by the prior art entail arrangements expensive to manufacture and furthermore all are of the type requiring that the sliding sleeve be in a particular axial position before the axial lock will be effective.

Accordingly, it is the object of this invention to provide an axial locking clutch which is structurally simple and economical to manufacture wherein the axial lock may take place at a plurality of positions of the axially slidable clutch sleeve. In accordance with the invention, a plurality of grooves, which may be of various shapes and which extend perpendicular to the rotational axis of the clutch sleeve, are provided in particular areas for the teeth on the clutch sleeve so that when the clutch sleeve is shifted these grooves will mate with grooves provided on either the hub member of the synchronizer or the clutch teeth on the gear being engaged, to produce an axial lock of the clutch sleeve.

The invention consists of the novel constructions, arrangements and devices to be hereafter described and claimed for carrying out the above stated objects and such other objects as will appear from the following description of a preferred embodiment of the invention illustrated with reference to the accompanying drawings wherein:

FIGURE 1 is a longitudinal sectional view of a synchronizer clutch embodying the principles of the invention;

FIGURE 2 is a partial sectional view taken along the line 2—2 of FIGURE 1;

FIGURE 3 is a partial sectional view taken along the line 3—3 of FIGURE 1;

FIGURE 4 is a view similar to FIGURE 3 illustrating the positions of the parts when transmitting torque;

FIGURE 5 is a view similar to FIGURE 2 illustrating the configuration of a modified form of the groove structure;

FIGURE 6 is a longitudinal sectional view of the synchronizer clutch illustrating another embodiment of the invention;

FIGURE 7 is a view similar to FIGURE 5 illustrating the clutch sleeve in its axially shifted position; and FIGURE 8 is a partial sectional view taken along the line 8—8 of FIGURE 6.

Referring to FIGURE 1 a portion of a transmission is illustrated comprising a clutch mechanism 10 which includes a hub member 11 for transmitting torque between the shaft (not illustrated) and the clutch sleeve 12 slidably mounted on hub 11. Portions of the second and third speed gears of the transmission, for example gears or rotary parts 13 and 14 are illustrated. Synchronizer rings 15 and 16 are provided which have frictional engagement with mating areas of the respective gears 13 and 14.

The synchonizer mechanism which coacts with the synchronizer rings 15 and 16 to synchronize the gears before engagement is not illustrated since it is not a part of the present invention and furthermore the present invention may be used in applications for making a positive clutch connection where synchronizer structure is not used. For a full disclosure of the synchronizer structure reference may be had to White et al. Patent No. 2,221,900 of common assignee.

Gears 13 and 14 have clutch teeth 17 and 18 respectively thereon adapted to be engaged by the clutch sleeve 12 to provide a positive driving connection between the hub 11 and gear 13 or gear 14. Synchronizer rings 15 and 16 have gear teeth 19 and 20 thereon which are functional in the synchronizing operations (not described herein).

The clutch sleeve 12 has a large outer annular groove 25 formed therein adapted to be engaged by a shift fork (not illustrated) for moving the clutch sleeve. The clutch sleeve includes internal teeth 26 which intermesh with external teeth 27 formed on the hub member 11.

As illustrated in FIGURE 2, a plurality of threadlike grooves 30 extending perpendicular to the axis of rotation of the sleeve 12 are formed in the teeth 26 on each end as indicated at 31 and 32. Similar grooves 33 are formed in the clutch teeth 17 and 18 on the gears 13 and 14 and extend perpendicular to the axis of rotation of the gears. The grooves 30 and 33 are quite shallow and, for example, may have a maximum depth of approximately .005 to .015 inch.

The grooved areas of clutch teeth 26 as indicated at 31 and 32 extend over a greater length of the teeth 26 than the length of the teeth 17 or 18 on the gears 13 and 14 as will be apparent from FIGURE 2.

In operation, when the clutch sleeve 12 is axially displaced relative to the hub 11 as for example as indicated in dotted lines in FIGURE 1 where it is moved to the right to engage the clutch teeth 18 on gear 14, the groove 30 in the clutch sleeve 26 will be opposite the grooves 33 formed in the clutch teeth 18 on the gear 14. Thus when torque is transmitted the clutch sleeve 12 can be displaced rotationally with respect to the gear 14 to effect an engagement between the grooves 30 on teeth 26 and grooves 33 on teeth 18 as illustrated in FIGURE 4. Due to the engagement of the grooves 30 and 33 the clutch sleeve 12 will be locked axially and be held from axial movement in either direction and thereby be prevented from moving to the right or to the left out of engagement with teeth 18. It will be apparent that due to the width of the area 32 on the teeth 26 having grooves 30 that a plurality of axial positions of the clutch sleeve 12 is possible wherein the axial lock will be effective and thus precise positioning of the clutch sleeve is unnecessary to effect axial locking of the sleeve 12.

In FIGURE 5 an alternate form of the grooves formed in the teeth 26 of the sleeve 12 and the teeth 18 or teeth 17 of gears 13 and 14 as illustrated wherein square grooves 35 are provided in teeth 26 and matching square grooves 36 are provided in the clutch teeth 17 or 18. The operation of the device is the same as that described above when the square groove configuration is used to provide an axial lock.

Referring to FIGURE 6 another embodiment of the invention is illustrated. The parts of the transmission illustrated in FIGURE 6 are identical to those in FIGURE 1 and have numbers corresponding to the numbers in FIGURE 1 although they are in the 100 series. In FIGURE 6 the clutch sleeve 112 is provided with a series of grooves 130 at 131 and 132 and matching grooves 133 are provided in the center of the teeth 127 of the hub 111. The operation of the embodiment of FIGURE 6 is similar to that described above for the embodiment of FIGURE 1, however, with the grooves formed in the center of the hub 111 in the FIGURE 6 embodiment, the axial locking action takes place between the sleeve 112 and the hub 111 rather than between the sleeve and the gear as in the embodiment of FIGURE 1. In this connection either the square type groove as illustrated in FIGURE 5 or the thread-like V-shaped grooves illustrated in FIGURE 2 may be used in the FIGURE 6 embodiment to provide the axial locking action.

In FIGURE 8 the teeth 126 and 127 are illustrated during torque transmission showing engagement between the grooves 130 and 133. As can be seen in FIGURE 8 the grooves 130 on teeth 126 are formed in a raised area of the teeth 126 as indicated at 138 and a line drawn through the base of the grooves 130 will be in alignment with the surfaces of teeth 126. The raised portion 138 is raised approximately .005" to .015" corresponding to the depth of the grooves. To permit engagement of grooves 130 and 133 the grooves 130 are formed in raised portion 138 while grooves 133 are formed in the surface of teeth 127 and the high points of the grooves 133 will be flush with the surface of teeth 127.

From the above it will be apparent that applicant has provided an improved axial locking clutch which is simple and easy to manufacture while at the same time providing advantages not found in the prior art. The construction of the grooves on the teeth of the parts of the clutch may be formed without any modification of existing parts, other than a rolling or other operation necessary to form the grooves in the teeth. Further, the axial locking clutch of this invention is greatly advantageous in that an axial lock is provided at a plurality of axial positions of the clutch sleeve 12 or 112. The axial locking function takes place without the necessity of exact positioning of the clutch sleeve when engaging a gear whereas the devices known heretofore in the art have required a particular position of the clutch sleeve to attain the axial locking function.

I wish it to be understood that the invention is not to be limited to the specific constructions, arrangements and devices shown and described except only insofar as the claims may be so limited as it will be apparent to those skilled in the art that changes may be made without departing from the principles of the invention.

What is claimed is:

1. In a clutch mechanism, a hub member with teeth thereon, a sleeve encircling said hub member having teeth meshing with the teeth on said hub, a rotary member adjacent said hub member, said sleeve being axially slidable with respect to said hub member to engage said rotary member, a first means formed on the teeth of said sleeve, a second means formed on one of said members, said first and second means adapted to cooperate when said sleeve is axially displaced to engage said rotary member to provide an axial lock of said sleeve to prevent disengagement of said sleeve from said rotary member when said mechanism is transmitting torque, said first and second means being operative to establish said axial lock and thereby prevent disengagement of said sleeve from said rotary member at a plurality of axial positions of said sleeve with respect to said hub rotary members.

2. In a clutch mechanism, a hub member with teeth thereon, a sleeve encircling said hub member and having teeth meshing with the teeth on said hub member, a rotary member adjacent said hub member, said sleeve being axially displaceable with respect to said hub member to engage said rotary member, groove means formed on the teeth of said sleeve, a second groove means formed on one of said members, said first and second groove means adapted to cooperate to provide an axial lock of said sleeve when said sleeve is axially displaced with respect to said hub member to engage said rotary member when said mechanism is transmitting torque, said first and second groove means being operative to establish said axial lock at a plurality of positions of said sleeve with respect to said hub member.

3. In a clutch mechanism, a hub member with teeth thereon, a sleeve encircling said hub member having teeth meshing with the teeth on said hub member, a rotary member adjacent said hub member and having teeth thereon, said sleeve being axially displaceable with respect to said hub member to engage the teeth on said rotary member, a first groove means formed on the teeth of said sleeve, a second groove means formed on the teeth of one of said members, said sleeve member adapted to be rotationally displaced with respect to said hub member when said sleeve member is axially displaced with respect to said hub member to engage said rotary member whereby said first and second groove means will engage to provide an axial lock of said sleeve preventing disengagement of said sleeve from said rotary member when said mechanism is transmitting torque, said first and second groove means being operative to establish said axial lock in a plurality of positions of said sleeve with respect to said hub member.

4. In a clutch mechanism, a hub member with teeth thereon, a sleeve encircling said hub member having teeth meshing with the teeth on said hub member, a rotary member adjacent said hub member having teeth thereon, said sleeve being axially displaceable with respect to said hub member to engage said teeth on said rotary member, V-shaped groove means formed on the teeth of said sleeve, a second V-shaped groove means formed on the teeth of one of said members, said sleeve being rotationally displaceable with respect to said hub member when said sleeve has been axially displaced to engage the teeth on said rotary member whereby said first and second V-shaped groove means will be engaged to provide an axial lock of said sleeve when said sleeve is axially displaced to engage said teeth on said rotary member and thereby prevent disengagement of said sleeve from said rotary member when said mechanism is transmitting torque, said first and second V-shaped groove means being operative to establish said axial lock in a plurality of positions of said sleeve with respect to said hub member.

5. In a clutch mechanism, a hub member with teeth thereon, a sleeve encircling said hub member having teeth meshing with the teeth on said hub member, a rotary member adjacent said hub member having teeth thereon, said sleeve being axially displaceable with respect to said hub member to engage said teeth on said rotary member, square-shaped groove means formed on the teeth of said sleeve, a second square-shaped groove means formed on the teeth of one of said members, said sleeve being rotationally displaceable with respect to said hub member when said sleeve has been axially displaced to engage the teeth on said rotary member whereby said first and second square-shaped groove means will be engaged to provide an axial lock of said sleeve when said sleeve is axially displaced to engage said teeth on said rotary member and thereby prevent disengagement of said sleeve from said rotary member when said mechanism is transmitting torque, said first and second square-shaped groove means being operative to establish said axial lock in a plurality of positions of said sleeve with respect to said hub member.

6. In a clutch mechanism, a hub member with teeth thereon, a sleeve encircling said hub member having teeth meshing with the teeth on said hub member, a rotary member adjacent said hub member having teeth thereon, said sleeve being axially displaceable with respect to said hub member to engage said teeth on said rotary member, V-shaped groove means formed on the teeth of said sleeve, a second V-shaped groove means formed on the teeth of said hub member, said sleeve rotationally displaceable with respect to said hub member when said sleeve has been axially displaced to engage the teeth on said rotatry member whereby said first and second V-shaped groove means will be engaged to provide an axial lock of said sleeve when said sleeve is axially displaced to engage said teeth on said rotary member and thereby prevent disengagement of said sleeve from said rotary member when said mechanism is transmitting torque, said first and second V-shaped groove means being operative to establish said axial lock in a plurality of positions of said sleeve with respect to said hub member.

7. In a clutch mechanism, a hub member with teeth thereon, a sleeve encircling said hub member having teeth meshing with the teeth on said hub member, a rotary member adjacent said hub member having teeth thereon, said sleeve being axially displaceable with respect to said hub member to engage said teeth on said rotary member, square-shaped groove means formed on the teeth of said sleeve, a second square-shaped groove means formed on the teeth of said rotary member, said sleeve being rotationally displaceable with respect to said hub member when said sleeve has beetn axially displaced to engage the teeth on said rotary member whereby said first and second square-shaped groove means will be engaged to provide an axial lock of said sleeve when said sleeve is axially displaced to engage said teeth on said rotary member and thereby prevent disengagement of said sleeve from said rotary member when said mechanism is transmitting torque, said first and second square-shaped groove means being operative to establish said axial lock in a plurality of positions of said sleeve with respect to said hub member.

References Cited by the Examiner
UNITED STATES PATENTS

| | | | |
|---|---|---|---|
| 1,597,198 | 8/1926 | Howell. | |
| 2,070,140 | 2/1937 | Peterson et al. | 192—114 |
| 3,043,414 | 7/1962 | Peras | 192—114 |

DAVID J. WILLIAMOWSKY, *Primary Examiner.*

BENJAMIN W. WYCHE, III, *Examiner.*

UNITED STATES PATENT OFFICE
CERTIFICATE OF CORRECTION

Patent No. 3,303,915　　　　　　　　　　　　February 14, 1967

John C. Oesterle

It is hereby certified that error appears in the above numbered patent requiring correction and that the said Letters Patent should read as corrected below.

Column 3, line 63, after "hub" insert -- and --; column 5, line 19, for "beetn" read -- been --.

Signed and sealed this 17th day of October 1967.

(SEAL)
Attest:

Edward M. Fletcher, Jr.
Attesting Officer

EDWARD J. BRENNER
Commissioner of Patents